(12) United States Patent
Ferrazzini et al.

(10) Patent No.: US 8,488,786 B2
(45) Date of Patent: Jul. 16, 2013

(54) SECURITY METHOD AND DEVICE FOR MANAGING ACCESS TO MULTIMEDIA CONTENTS

(75) Inventors: Axel Ferrazzini, Paris (FR); Diego Anza, Madrid (ES); Pascal Chauvaud, Issy les Moulineaux (FR)

(73) Assignee: France Telecom, Paris (FR)

( * ) Notice: Subject to any disclaimer, the term of this patent is extended or adjusted under 35 U.S.C. 154(b) by 765 days.

(21) Appl. No.: 11/918,192

(22) PCT Filed: Apr. 6, 2006

(86) PCT No.: PCT/FR2006/050306
§ 371 (c)(1),
(2), (4) Date: May 5, 2008

(87) PCT Pub. No.: WO2006/106270
PCT Pub. Date: Oct. 12, 2006

(65) Prior Publication Data
US 2009/0088068 A1    Apr. 2, 2009

(30) Foreign Application Priority Data

Apr. 7, 2005 (FR) .................................. 05 03469
Oct. 10, 2005 (FR) .................................. 05 10314

(51) Int. Cl.
*H04N 7/167* (2011.01)
(52) U.S. Cl.
USPC ............... 380/200; 380/43; 725/31; 386/283; 386/277
(58) Field of Classification Search
USPC ... 380/201, 223, 226, 239; 713/158; 455/411, 455/558; 725/31
See application file for complete search history.

(56) References Cited

U.S. PATENT DOCUMENTS

| | | | |
|---|---|---|---|
| 6,021,198 A * | 2/2000 | Anigbogu et al. | 380/269 |
| 6,631,101 B1 * | 10/2003 | Chan et al. | 369/30.36 |
| 6,731,758 B1 * | 5/2004 | Graunke et al. | 380/239 |
| 7,031,964 B1 * | 4/2006 | King et al. | 1/1 |

(Continued)

FOREIGN PATENT DOCUMENTS

| | | |
|---|---|---|
| JP | 06-216897 A | 8/1994 |
| JP | 2002-135350 A | 5/2002 |
| JP | 2004-133654 A | 4/2004 |
| JP | 2004-304697 A | 10/2004 |

*Primary Examiner* — Jeffrey D Popham
*Assistant Examiner* — Daniel Potratz
(74) *Attorney, Agent, or Firm* — Knobbe Martens Olson & Bear LLP

(57) ABSTRACT

A method of managing the sending of multimedia contents to a mobile terminal (2) equipped with a security module (3), the multimedia contents being sent in encrypted form from a broadcast server (1) and via a communications network (4). The method comprises the following steps: a) sending to the mobile terminal (2) rights-of-use data for a multimedia content, b) storing said rights-of-use data in the security module (3) of the mobile terminal (2), c) generating a series of encryption/decryption keys, the series of decryption keys being generated from rights-of-use data stored in the security module (3), d) sending the multimedia content to the mobile terminal (2), the content being encrypted with successive keys from the series of encryption keys that has been generated, and e) the mobile terminal receiving the multimedia content and decrypting the multimedia content using the decryption keys from the series of decryption keys generated in the security module of the mobile terminal.

10 Claims, 3 Drawing Sheets

U.S. PATENT DOCUMENTS

| | | | |
|---|---|---|---|
| 7,602,908 B2 * | 10/2009 | Pare et al. | 380/37 |
| 7,739,299 B2 * | 6/2010 | Kii et al. | 707/781 |
| 2001/0052077 A1 | 12/2001 | Fung et al. | |
| 2004/0157584 A1 * | 8/2004 | Bensimon et al. | 455/411 |

* cited by examiner

SECURITY METHOD AND DEVICE FOR MANAGING ACCESS TO MULTIMEDIA CONTENTS

RELATED APPLICATIONS

This is a U.S. national stage of application No. PCT/FR2006/050306, filed on Apr. 6, 2006.

This application claims the priority of French patent application nos. 05/03469 filed Apr. 7, 2005 and 05/10314 filed Oct. 10, 2005, the content of both of which is hereby incorporated by reference.

FIELD OF THE INVENTION

The present invention relates to sending mobile terminals digital or multimedia contents and in particular encrypted contents in the form of audiovisual programmes.

BACKGROUND OF THE INVENTION

Most current solutions for broadcasting encrypted audiovisual programmes via cable or satellite have major security weaknesses that are exploited by numerous fraudsters. At present fraudsters are even organizing networks for distributing the codes and software for generating the codes that are indispensable for decrypting broadcast programmes (some of which have a high added value, such as films or live football matches).

This is caused in part by the absence in existing systems of any permanent and individual bidirectional connection with users and therefore by the impossibility of verifying in real time the rights of users to view the encrypted programmes. Many subscribers take out a basic subscription but succeed in obtaining the codes corresponding to higher level rights, and can therefore benefit from those rights without paying for them.

Moreover, at present there is no way to resume the playback of an encrypted content where it was interrupted because of an intentional interruption by the user or an unintentional interruption. For example, in the context of a receiver situated in a mobile telephone, viewing may be interrupted frequently by telephone calls or by an interruption in network coverage. This limitation is a great nuisance for users, in particular in a mobile context.

OBJECT AND SUMMARY OF THE INVENTION

The present invention aims to remedy the above-mentioned drawbacks and to propose a solution enabling mobile telephone users to view encrypted audiovisual programmes in a more secure manner and in which it is possible to resume reception where the interruption occurred.

These objects are achieved by a method of managing the sending of multimedia contents to a mobile terminal equipped with a security module, said multimedia contents being sent in encrypted form from a broadcast server and via a communications network, the method being characterized in that it comprises the following steps:

a) sending to the mobile terminal rights-of-use data for a multimedia content;

b) storing said rights-of-use data in the security module of the mobile terminal;

c) generating a series of encryption/decryption keys, the series of decryption keys being generated from rights-of-use data stored in the security module;

d) sending the multimedia content to the mobile terminal, said content being encrypted with successive keys from the series of encryption keys that has been generated; and e) the mobile terminal receiving the multimedia content and decrypting the multimedia content using the decryption keys from the series of decryption keys generated in the security module of the mobile terminal.

Thus multimedia contents such as audiovisual programmes can be sent to mobile terminals in a secure manner by dynamically changing the encryption/decryption keys in parallel in the broadcast server and in the mobile terminal.

According to one aspect of the invention, to enable playback to resume in the event of an interruption of sending the multimedia content, the method further comprises a step f) in which the mobile terminal sends the broadcast server reference data from the last frame received or from the encryption key being used at the time of the interruption, and a step g) of resuming broadcasting of the multimedia content as a function of said reference data. In step c), each encryption/decryption key is generated for a time corresponding to a time interval defined by each frame sent by the broadcast server.

Thus, in the method of the invention, the user can return to a programme at a place close to the interruption, whether initiated by the user or caused by external factors.

According to another aspect of the invention, the method further comprises a step h) of verifying the validity of the rights-of-use in the mobile terminal, the verification being effected by interrogating rights-of-use data stored in the security module and comparing it with rights-of-use data stored in a database.

As a function of the result of this verification, the service provider can at any time (provided that the telephone is within the network coverage area) verify the validity of the rights, modify them, and interrupt the service if necessary.

To enhance the security of multimedia contents sent over the communications network, in step c) the keys of the series of decryption keys are calculated iteratively on the basis of a basic key and a secret code, said secret code being defined beforehand and exchanged between the mobile terminal and the broadcast server.

For a mobile telephone equipped with a (U)SIM card, for example, the invention proposes a method of encrypting programmes using a key that is changed dynamically in time in accordance with a series known only to the (U)SIM card and to the service provider. These keys are calculated iteratively on the basis of a right obtained by the user before the programme is sent and stored in the (U)SIM card. The validity of those rights can be verified at any time provided that the user is within the network coverage area. The service provider can at any time repudiate the rights verified in this way (or not).

The decryption procedure can be reinitialized at a time close to an intentional interruption by the user or an unintentional interruption by communicating to the server a reference supplied by the (U)SIM card. The method comprises the following steps:

(a) Storing the rights of the user in the (U)SIM card containing the basic encryption keys.

(b) Generating a series of keys used to encrypt the programme at a frequency defined by the service provider. This generation is based on a basic key and is effected in parallel in the card or the terminal and in the server of the service provider that encrypts and sends the programme.

(c) Communicating to the service provider a reference supplied by the (U)SIM card (for example the number of the key or the key itself) and indicating the position at which decryption was interrupted, in order to resume sending the programme.

The invention also provides a security module adapted to be included in a mobile communication terminal, said terminal being used to receive multimedia contents sent in encrypted form, the module being characterized in that it comprises means for storing rights-of-use data for a multimedia content and means for calculating a series of decryption keys from the stored rights-of-use data and storing them.

This module may further comprise means for storing reference data from the last frame received or from the encryption key being used at the time of interruption of sending a multimedia content to the mobile terminal.

The invention also provides a mobile terminal equipped with a security module as described above and to a computer program intended to be executed in such a mobile terminal, the program including instructions for generating a series of encryption/decryption keys, the series of decryption keys being generated from rights-of-use data received by the mobile terminal, and instructions for decrypting a multimedia content received by the mobile terminal using the decryption keys from the series of decryption keys that has been generated.

The invention further provides a broadcast server comprising means for sending multimedia contents in encrypted form via a communications network to a mobile terminal equipped with a security module, the server being characterized in that it comprises means for sending the mobile terminal rights-of-use data for the multimedia contents sent including data for calculating a series of decryption keys similar to a series of encryption keys calculated by said server.

This server may further comprise a database for storing rights-of-use data sent to the mobile terminal and means for consulting rights-of-use data stored in the security module of the mobile terminal and comparing it with rights-of-use data stored in the database.

The broadcast server can be implemented by means of a computer program including instructions for generating a series of encryption/decryption keys, instructions for sending a mobile terminal rights-of-use data for a multimedia content including data for calculating a series of decryption keys similar to a series of encryption keys calculated by said server, and instructions for sending the multimedia content to the mobile terminal, said content being encrypted with successive keys from the series of encryption keys that has been generated.

Finally, the present invention also consists in a multimedia content transmission management system comprising a mobile terminal equipped with a security module and a broadcast server as defined above.

BRIEF DESCRIPTION OF THE DRAWINGS

The features and advantages of the present invention emerge more clearly from the following description, which is given by way of illustrative and non-limiting example and with reference to the appended drawings, in which.

DETAILED DESCRIPTION OF THE DRAWINGS

The present invention applies to mobile telephones or any kind of mobile terminal equipped with a screen and a security module, able to communicate over a standard mobile telephone network, and able to receive multimedia contents such as digital audiovisual streams. These devices increasingly constitute small pocket computers which, as is well known, comprise, on a smaller scale, the basic resources found in standard computers. More precisely, these telephones include in particular processing means such as a processor for executing programs and storage means for storing data. As is well known, the processor can be part of a SIM (subscriber identity module) or USIM (universal subscriber identity module, commonly written (U)SIM) microchip card that additionally constitutes an inviolable strongbox offering a level of security equivalent to or greater than that of a standard terminal. This is why, as explained in detail below, the solution in accordance with the present invention provides means for using the security module and its permanent bidirectional connection to the network of the operator to enable the terminal to manage ergonomically interruptions of service and to enable the service provider (e.g. Orange™) to have immediate access to a secure procedure for initializing, modifying, verifying, and revoking rights. However, some mobile terminals have no independent physical medium, for example no microchip card. The security module is then implemented directly in the processing and storage means of the mobile terminal, a portion of the memory of the mobile terminal being reserved for data sent to the security module as described in detail below.

That detailed description is limited to mobile telephone terminals equipped with a (U)SIM card.

Figure 1:
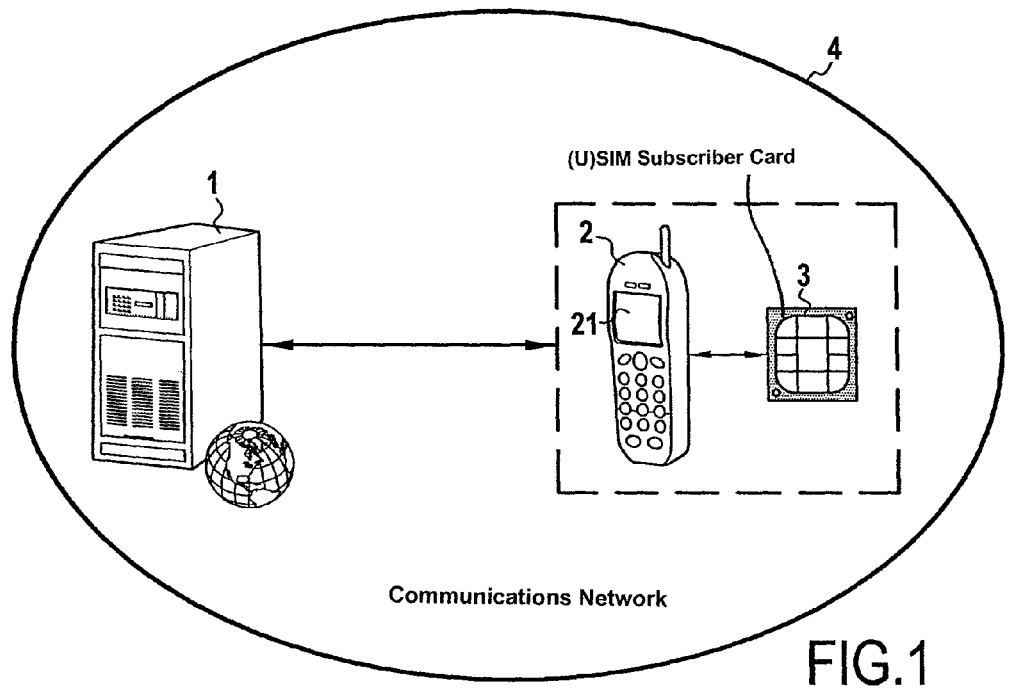
FIG. 1 is a diagrammatic overview of the system used in the invention.

FIG. 1 is a simplified diagram showing the relations between the principal elements that are used in the programme transmission system and method according to the invention. As represented in FIG. 1, the system comprises a server 1 and a telephone 2 comprising a screen 21 and a removable (U)SIM subscriber card 3. The system further comprises a mobile telephone network 4 enabling communication between the server 1, the telephone 2, and the SIM card 3. The server 1 controls transmission and content security management (in particular encryption).

The telephone 2 and the (U)SIM subscriber card 3 communicate via a software interface in a manner that is known in the art. In a mobile telephone, for example, this interface is standardized by the ETSI (European Telecommunication Standards Institute). Consequently, the server 1 can access the memory of the (U)SIM subscriber card 3 in read mode and in write mode via the mobile telephone network 4 and the telephone 2 in which the card is inserted.

Figure 2:
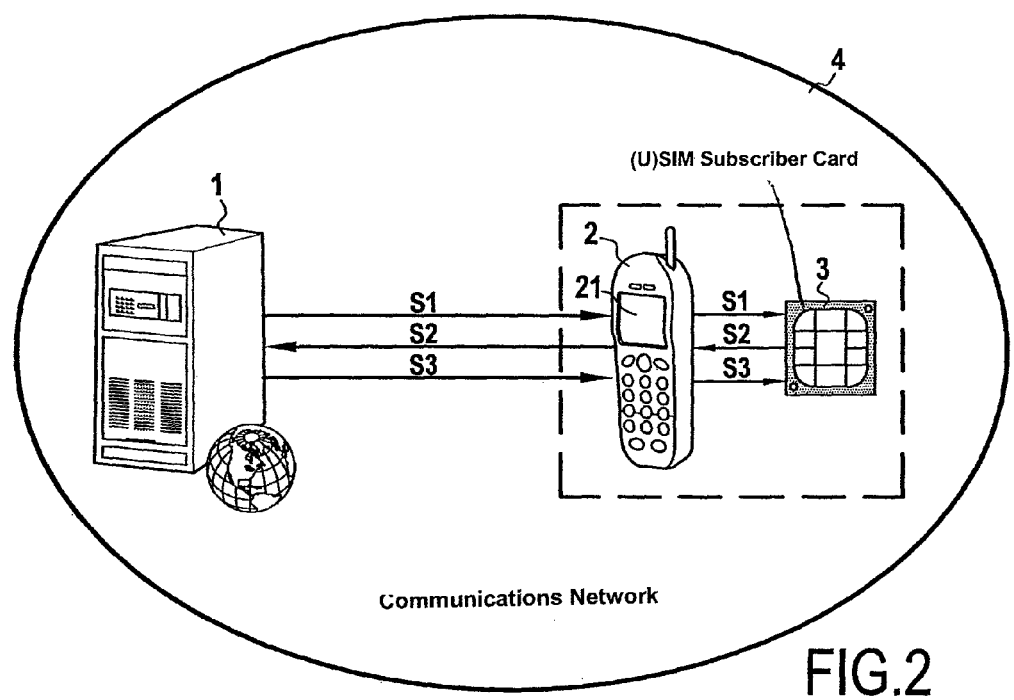
FIG. 2 illustrates one example of data management in accordance with the invention in a (U)SIM card.

FIG. 2 is a diagram showing communication between the server 1, the telephone 2, and the (U)SIM card 3. This communication, via the mobile telephone network 4, enables identification and authentication of the user's mobile terminal and (U)SIM card (steps S1 and S2) and enables rights-of-use acquired by the user to be sent and stored securely on the (U)SIM card (step S3). These rights conventionally include associations with the programmes to which the rights relate, decryption keys, elements guaranteeing the authenticity of the rights, and so on, and have been standardized by various organizations (in particular the Open Digital Rights Language Initiative and the Open Mobile Alliance). For example, the SIM Toolkit application can distribute these rights securely to a location in the memory of the card. Storing the rights enables the service provider at any time thereafter to verify, modify, and if necessary repudiate the rights stored on the (U)SIM card, provided that the telephone is being used in the coverage area of the mobile network and in accordance with the standardized GSM/UMTS protocols.

A particular instance of this scenario is modification of these rights at the initiative of the subscriber and of the service provider, which can be effected immediately, via the mobile network. If the service provider wishes to modify the rights, it suffices to store the new rights in place of the old ones.

The steps executed on resuming sending of the TV programme in accordance with the present invention are explained next with reference to FIGS. 3 and 4.

Figure 3:
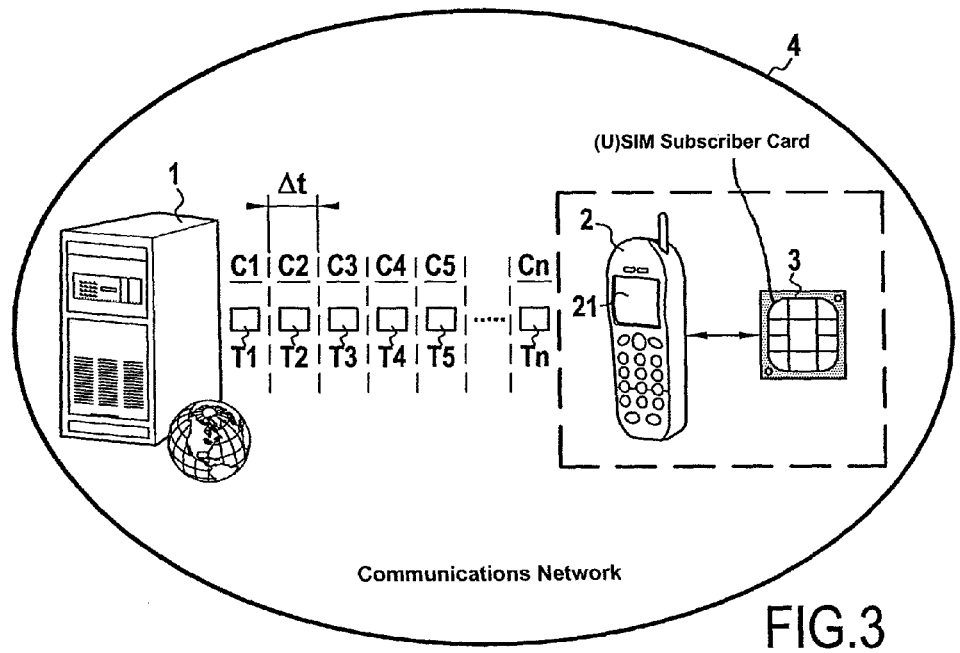
FIG. 3 illustrates one example of transmitting an encrypted audiovisual programme.

As shown in FIG. 3, after acquisition of the rights-of-use by the (U)SIM card 3 as described above, the server 1 sends the telephone 2 an audiovisual programme in encrypted form via the mobile communications network 4. Depending on the transmission technique used to send data over the mobile telephone network (e.g. a UMTS (3G) network), the audiovisual programme is broadcast in a succession of frames T1 to Tn, each frame defining a time interval Δt in which a portion of the data of the audiovisual programme is sent to the telephone 2. Consequently, by virtue of its location in the transmission system and the time interval that it represents, each frame corresponds to a particular moment (or time span) of the transmitted audiovisual programme. According to a first aspect of the invention, the (U)SIM card can store a number of each frame received and so can indicate the last frame number received at the time of an interruption. According to another aspect of the present invention, each frame can be encrypted with its own encryption key, so that each frame T1 to Tn can be identified with a distinct encryption key, respectively T1 to Tn in FIG. 3. The (U)SIM card 3 that has received the rights to decrypt the programme sent to the telephone generates a series of decryption keys similar to the series of encryption keys C1 to Cn. The (U)SIM card 3 is therefore in a position to indicate the encryption/decryption key used at any time during transmission.

Figure 4:
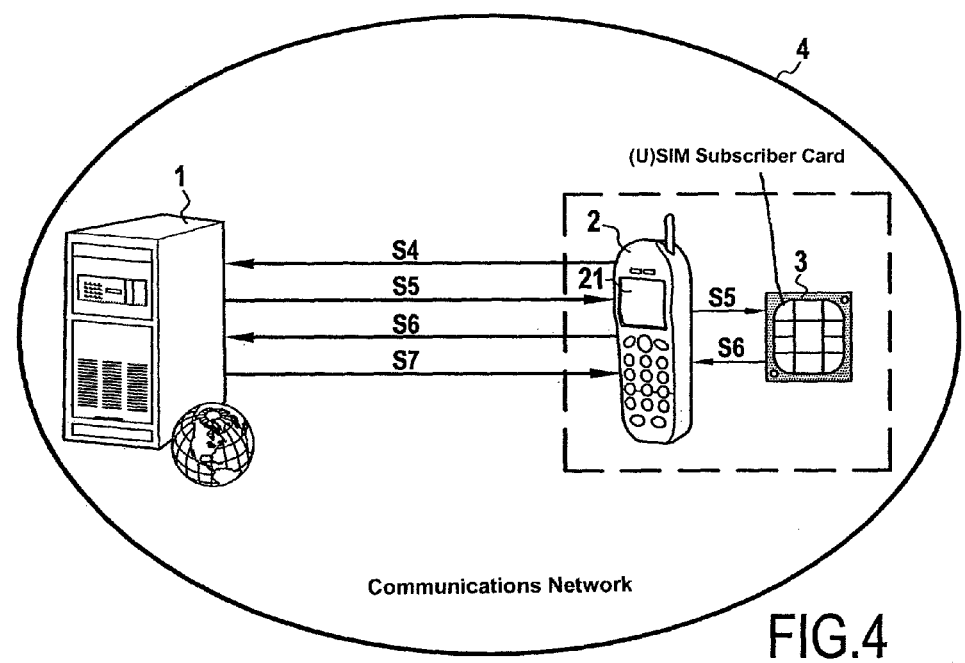
FIG. 4 illustrates one example of key recovery to resume the reception of programmes in accordance with the invention.

Accordingly, in the event of interruption of broadcasting the programme, the mobile telephone 2 requests resuming of sending the programme that was previously interrupted (step S4, FIG. 4). The server 1 then asks the (U)SIM card 3 for the time at which the transmission of the programme was interrupted (step S5). The (U)SIM card then responds to the server by giving it a reference of the last frame received or the key used to encrypt the last frame received, indicating when the interruption occurred (step S6). If necessary, the server updates the rights stored on the (U)SIM card in order to resume sending the programme where it was interrupted (step S7).

Examples of managing the references of the keys used to encrypt the broadcast content are described next.

There are various ways to generate these keys. One particularly secure solution is to use a secret (e.g. a PIN) common to the service provider and the card of the user (depending on the solution employed, this secret can optionally be personalized using a key diversification algorithm). This secret is entered into the card either when personalizing the card or by secure downloading at the time of taking out the subscription with the service provider.

This common secret is then used to calculate from the first decryption key contained in the rights associated with the digital content a series of encryption/decryption keys used to encrypt/decrypt the successive frames of the content, both on the server side for encryption and on the card side for decryption.

To calculate this series, a cryptographic function can be used, for example another encryption algorithm such as the AES (Advanced Encryption Standard) algorithm, or any algorithm suitable for the length of this decryption key (conventionally 128 bits). This algorithm is applied iteratively to the preceding key used and to the secret to obtain the next key to be used. This procedure is effected in parallel with decryption using the "INPUT" key of the cryptographic function.

The secret can naturally be renewed at the initiative of the service provider as a function of its requirements and using the GSM secure key downloading facility.

The algorithm can also be renewed if it has been broken by the scientific community, which gives the service provider complete flexibility in terms of its security architecture. Moreover, a plurality of algorithms can be present in the card to provide for changing from one to another if necessary.

The same calculations are therefore iterated both in the broadcast server and in the card, and so it is possible to have the same series of keys in both entities and consequently to generate a series of references that can be either the number of the frame or the value of the key used for that frame (encrypted by means of another key).

To resume viewing following an interruption, it is therefore sufficient for the card to store this reference dynamically and to send it to the server if the server requests it. The methods for resuming viewing with the aid of this reference vary according to whether it is a question of point-to-point transmission or point-to-multipoint broadcasting. These methods are well known in the art and for simplicity are not described in more detail here.

Figure 5:
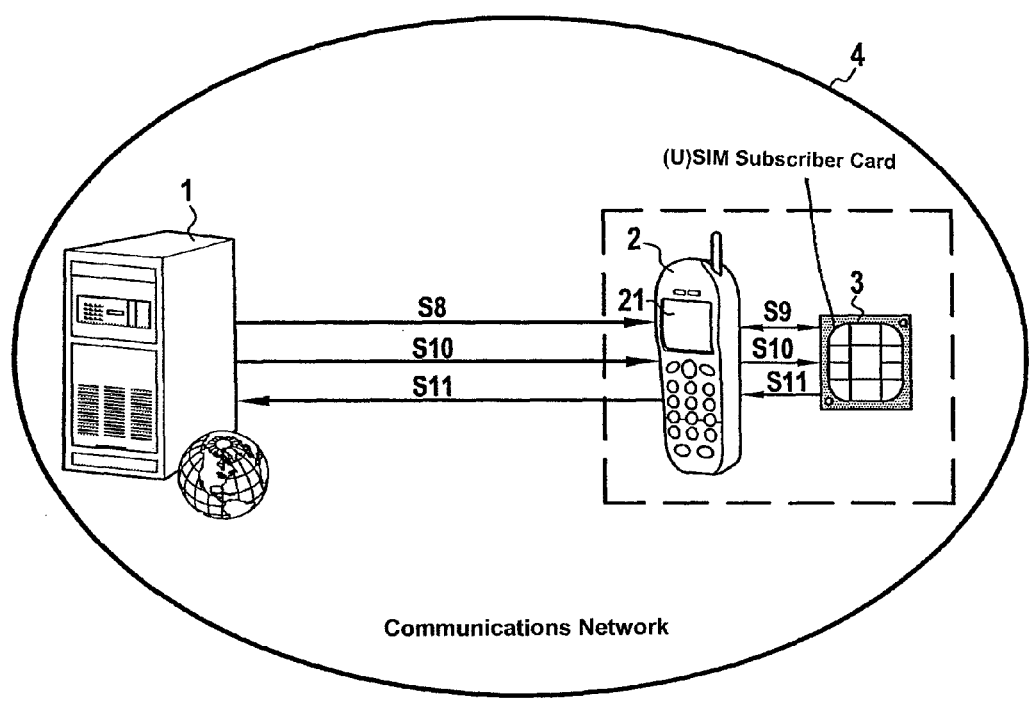
FIG. 5 is one example of rights verification enabling the service provider to repudiate the rights of the user (or not) following their verification.

FIG. 5 illustrates the steps carried out to verify the rights-of-use.

The mobile telephone 2 is in the coverage area of the mobile telephone network 4 and may optionally be in the process of reading (i.e. decrypting) an audiovisual content sent by the service provider (steps S8 and S9). The server 1 sends a command to verify the validity of the rights held by the user and stored on the user's (U)SIM card 3 (step S10). The (U)SIM card 3 then responds to the server by indicating the rights that the user holds. The form of the response from the (U)SIM card to the server depends on the protocol used. For example, the (U)SIM card can respond to the server by sending it an encrypted SMS message corresponding to the rights of the user (3GPP standard 23.048). The rights-of-use granted to the user can be highly varied. They generally correspond to constraints or limitations on use of multimedia contents. Those constraints or limitations are interpreted by a DRM agent (software effecting specific digital rights management operations) and applied to the multimedia contents concerned. For example, the rights-of-use may relate to:
 a limit date of use of a content;
 a number of times that a content can be used;
 an identity with which a content can be associated;
 particular conditions on use (e.g. a user must be in the coverage area of the mobile network to be able to use a content).

The rights-of-use can be expressed in various languages, depending on the rights management technology employed. For example, the rights-of-use can be written in ODRL (Open Digital Rights Language) as used in the OMA (Open Mobile Alliance) standard or in XrML (eXtensible rights Markup Language) as used by the Windows Media® DRM platform.

As bidirectional communication exists in a mobile network, the response of the (U)SIM card regarding the rights-of-use held by the user is then sent to the service provider via the mobile network (step S11). Thus the server can verify the validity of the rights by comparing them to the rights that the user acquired beforehand and are stored in the user database. If there is any discrepancy, it can conduct a search to explain the discrepancy (for example a delay in synchronizing the databases following a recent transaction). On detection of an attempted fraud by the user, the provider could take the appropriate measures immediately, for example by destroying any rights contained in the card or billing for access to the programmes added illicitly to the card. The method used to destroy rights is analogous to that used to store or modify rights in the card, as already explained (cf. FIG. 1).

The invention claimed is:

1. A method of managing sending of multimedia contents to a mobile terminal equipped with a security module, said multimedia contents being sent in encrypted form from a broadcast server and via a communications network, the method comprising the steps of:
   a) sending to the mobile terminal rights-of-use data for the multimedia content;
   b) storing said rights-of-use data in the security module of the mobile terminal;
   c) generating a series of encryption/decryption keys, the series of decryption keys being generated from said rights-of-use data stored in the security module;
   d) sending the multimedia content to the mobile terminal, said multimedia content being encrypted with successive keys from the series of encryption keys that has been generated; and
   e) the mobile terminal receiving the multimedia content and decrypting the multimedia content using the decryption keys from the series of decryption keys generated in the security module of the mobile terminal;
      wherein the broadcast server encrypts each frame of the multimedia content with an encryption key, which is distinct from the successive keys from the series of encryption keys, such that each frame is identified by a distinct encryption key, the security module of the mobile terminal generating the series of decryption keys which correspond to the series of encryption keys; and
      wherein said method further comprises, in an event of an interruption of sending the multimedia content to the mobile terminal from the broadcast server, a step f) the mobile terminal sending the broadcast server the distinct encryption key being used at a time of the interruption and a step g) resuming sending the multimedia content to the mobile terminal as a function of said distinct encryption key sent by the mobile terminal at step f).

2. The method according to claim 1, wherein, in step c), each encryption/decryption key is generated for a time corresponding to a time interval defined by each frame of the multimedia content sent by the broadcast server.

3. The method according to claim 1, further comprising a step h) verifying the validity of the rights-of-use data in the mobile terminal, the verification being effected by interrogating rights-of-use data stored in the security module and comparing it with rights-of-use data stored in a database.

4. The method according to claim 1, wherein, in step c), the keys of the series of the decryption keys are calculated iteratively on the basis of a basic key and a predefined secret code, said predefined secret code being exchanged between the mobile terminal and the broadcast server.

5. A security module configured for inclusion in a mobile communication terminal, said mobile communication terminal being configured to receive multimedia content sent from a broadcast server in encrypted form by a series of encryption keys, the security module comprising:

memory for storing rights-of-use data for the multimedia content; and
a processor for calculating a series of decryption keys from the stored rights-of-use data and storing the series of decryption keys, each frame of the multimedia content being encrypted with an encryption key, which is distinct from the successive keys of the series of encryption keys, such that each frame is identified by a distinct encryption key, the processor of the security module generating the series of decryption keys corresponding to the series of encryption keys, sending the broadcast server the distinct encryption key being used at a time of an interruption of sending the multimedia content to the mobile communication terminal from the broadcast server, and causing the mobile communication terminal to resume receiving the multimedia content in response to sending the distinct encryption key to the broadcast server at the time of the interruption.

6. A mobile terminal including a display, and a security module according to claim 5.

7. A multimedia content transmission management system, comprising a mobile terminal according to claim 6, and a broadcast server configured to send multimedia contents in encrypted form via a communications network to the mobile terminal equipped with a security module, wherein a processor of the broadcast server sends the mobile terminal the rights-of-use data for the multimedia content to be sent including data for calculating a series of decryption keys which correspond to a series of encryption keys calculated by said broadcast server.

8. A non-transitory computer readable storage medium including a computer program executing on a processor of a mobile terminal having a display and a security module which, when enabled in the mobile terminal, causes multimedia content to be sent to the mobile terminal from a broadcast server, the computer program comprising:
   program code for decrypting the multimedia content received by the mobile terminal based on a series of decryption keys that has been generated;
   program code for generating the series of decryption keys based on rights-of-use data received by the mobile terminal and, the series of decryption keys corresponding to a series of encryption keys used to encrypt the multimedia content at the broadcast server, wherein each frame of the multimedia content is encrypted with an encryption key, which is distinct from the successive keys from the series of encryption keys, such that each frame is identified by the distinct encryption key; and
   program code for sending the broadcast server the distinct encryption key being used at a time of an interruption of sending the multimedia content to the mobile terminal from the broadcast server; and
   program code for resuming receiving the multimedia content from the broadcast server in response to sending the distinct encryption key to the broadcast server at the time of the interruption.

9. A broadcast server configured to send multimedia content in encrypted form via a communications network to a mobile terminal equipped with a security module, the broadcast server comprising:
   a hardware processor for sending the mobile terminal rights-of-use data for the multimedia content to be sent to the mobile terminal including data for calculating a series of decryption keys corresponding to a series of encryption keys calculated by said broadcast server;
   wherein the broadcast server is further configured to encrypt each frame of the multimedia content with an encryption key, which is distinct from the successive keys of the series of encryption keys, such that each frame is identified by a distinct encryption key, and to interrogate the security module of the mobile terminal about the distinct encryption key used at a time of interruption in sending the multimedia content to the mobile terminal from the broadcast server, wherein the broadcast server, in response to interrogating the security module of the mobile terminal, receives the distinct encryption key being used at the time of interruption and further resumes sending the multimedia content to the mobile terminal as a function of said distinct encryption key sent by the mobile terminal.

10. The broadcast server according to claim 9, further comprising a database for storing the rights-of-use data sent to the mobile terminal, the processor consulting rights-of-use data stored in the security module of the mobile terminal and comparing the rights-of-use data stored in the security module with rights-of-use data stored in the database.

* * * * *